May 28, 1963  D. S. BOREY  3,091,594
MIXING FINELY DIVIDED CONTACT PARTICLES IN A DENSE FLUID BED
Filed July 1, 1959
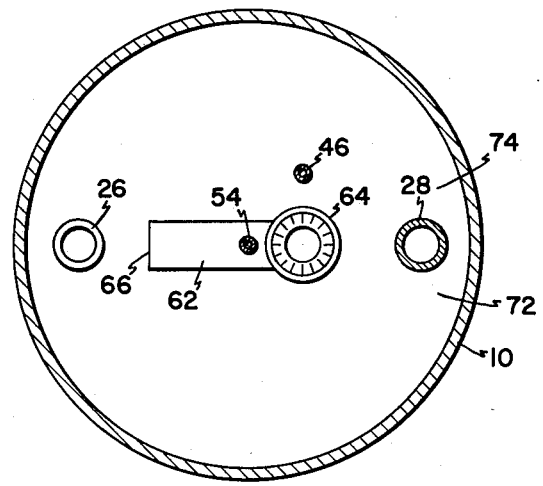
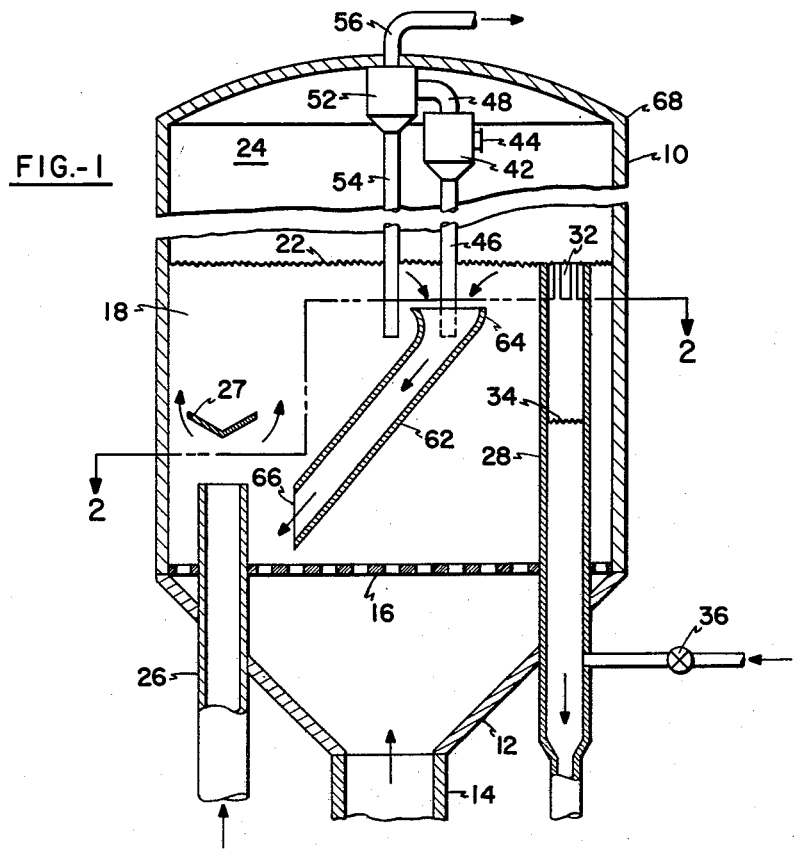
Daniel S. Borey INVENTOR
BY *George J. Nichany*
PATENT ATTORNEY United States Patent Office 3,091,594
Patented May 28, 1963

3,091,594
MIXING FINELY DIVIDED CONTACT PARTICLES
IN A DENSE FLUID BED
Daniel S. Borey, Chatham, N.J., assignor to Esso Research
and Engineering Company, a corporation of Delaware
Filed July 1, 1959, Ser. No. 824,426
6 Claims. (Cl. 252—417)

This invention relates to method and apparatus for obtaining improved mixing in a dense fluidized bed of finely divided contact of catalyst particles where the contact or catalyst particles are introduced into the lower portion of the dense fluid bed and contact or catalyst particles are withdrawn into an overflow well from the upper portion of the dense fluidized bed of solid particles. More particularly the invention relates to preventing or minimizing afterburning in the regeneration of finely divided solid contact or catalyst particles in hydrocarbon conversion operations.

In reaction zones of the type above described it is desirable to obtain good lateral mixing of the solid particles and gases or vapors passing up through the dense fluidized bed. While the invention is useful generally to promote lateral mixing in a dense fluidized bed, it will be specifically described in connection with the regeneration of fouled or partially spent catalyst particles containing burnable carbonaceous deposits. In the catalytic conversion or cracking of hydrocarbons, coke or carbonaceous material is deposited on the catalyst particles and the catalyst particles are then passed to a regeneration zone where the coke or carbonaceous material is burned off with air or other oxygen-containing gas. From the regeneration zone the regenerated catalyst particles are returned to the catalytic cracking or conversion zone.

In certain types of cracking units described in U.S. 2,589,124, granted March 11, 1952, the fouled or coked catalyst particles from the reaction are passed into the dense turbulent fluidized bed of solids in the regeneration zone at one side thereof and regenerated catalyst or contact solids are withdrawn from the top of the dense fluidized bed at the opposite side of the regeneration zone. In certain of these units the problem of afterburning has arisen because of relatively poor lateral mixing of the spent and regenerated catalyst in the dense fluidized bed in the regeneration zone. The gases leaving the dense fluidized bed in the regeneration zone contain carbon monoxide and some unburned hydrocarbons and in certain regions there is an excess of oxygen. The combustion of coke or carbonaceous material in the dense fluidized bed does not result in excessively high temperatures because there are sufficient solids to absorb the heat. However, when insufficient solids are present in the gases leaving the dense bed, combustion of combustible material in the combustion gases may result in undesirable high temperatures which are harmful to the catalyst and cyclone separators and other equipment.

Afterburning does not occur to any great extent if the temperature of the gases leaving the regeneration zone is maintained below about 1075° F. or if the oxygen content of the combustion gases is low, below about 1.5% by volume of the combustion gases, but if afterburning starts, the burning continues and is self-sustaining due to the higher reaction rate at the higher temperature and the temperature goes up rapidly.

It has been found that flue or combustion gases leaving the dense fluidized bed in the regeneration zone above the region of introduction of fouled catalyst to the regeneration bed contain relatively little excess oxygen. However, high oxygen concentrations exist in the flue or combustion gases flowing up from the region above and near the overflow well which promotes afterburning in the cyclone separators in this region. This is believed to be due to the relatively poor lateral mixing of the spent or coke containing catalyst particles in the dense fluidized bed in the regeneration zone. The catalyst particles are regenerated in the region of the addition of the spent catalyst particles and flow generally upwardly and then across toward the overflow well, but as the catalyst particles moving in this general manner are substantially regenerated by the time they reach the overflow well, the oxygen-containing gas or air passing up through the dense fluidized bed in the regeneration zone from the region around the overflow well is not fully utilized and there is an oxygen breakthrough at this region.

According to this invention one or more sloped or inclined mixing tubes are submerged in the dense fluidized bed of solid contact or catalyst particles in the regeneration zone. The inlet to the mixing tube is located near the top of the dense fluidized bed of solids in the regeneration zone and near the overflow well. The mixing tube slopes or extends down at an angle from the inlet to the bottom portion of the dense fluidized bed in the regeneration zone in the region near the place where spent or coke-containing solids are introduced. The mixing tube is hollow without any obstructions and is submerged in the dense fluidized bed of solids in the regeneration zone.

No aeration gas is supplied to the solids in the mixing tube and as solids are supplied from the dense fluidized bed to the inlet end or top of the mixing tube, fluidizing gas disengages from the solids and the solids flow down the mixing tube at an increased density, as for example standpipe density, and there is thus supplied a driving force for circulating the solids from near the overflow well down to the region of introduction of the spent or coke containing solids in the regeneration zone and improved mixing of the solids in the dense fluidized bed is obtained. With this improved mixing there is a more uniform oxygen content in the flue gases over the entire area of the dense fluidized bed and the problem of afterburning is minimized. In a broader application a slanting mixing tube is utilized to obtain better lateral mixing in a fluidized bed of solids where solids are introduced into the bed at one zone and withdrawn from the bed at another zone.

In the drawings:

FIG. 1 represents a vertical longitudinal cross section of one form of apparatus adapted to carry out the present invention; and FIG. 2 represents a horizontal transverse cross sectional view taken substantially on line 2—2 of FIG. 1 with certain parts omitted to facilitate the disclosure.

Referring now to the drawings, the reference character 10 designates a cylindrical reaction vessel provided with a conical bottom portion 12 and a gas inlet line 14. Arranged in the bottom of the reaction vessel 10 is a horizontal perforated distribution grid 16 for distributing the gas across the entire area of the reaction vessel. Supported on the distribution grid 16 is a dense fluidized turbulent bed of finely divided solids 18 having an upper level at 22 and a dilute phase 24 thereabove. The invention will be specifically described in connection with the regeneration of fouled catalyst from a catalytic cracking operation but it is to be understood that the apparatus can be used for other reactions.

Arranged at the lower portion of the reaction vessel 10 is a solids or catalyst inlet line 26 which extends through the distribution grid 16 and for a short distance thereabove. Spent or fouled finely divided catalyst or contact particles are introduced into the bottom portion of the reaction vessel through solids inlet line 26. Arranged above the top of the inlet line 26 is a conical deflector 27. In catalystic cracking the catalyst may be silica alumina, silica magnesia, activated bentonitic clays and the like.

The catalyst is of a size between about 200 and 400 standard mesh and has an average particle size between about 50 and 90 microns.

The gas introduced through bottom inlet 14 below the distribution grid 16 is air when catalyst is to be regenerated in reaction vessel 10 and the air is introduced at such a rate as to give a superficial velocity in the reaction vessel 10 above distribution grid 16 between about 1.5 and 5.0 ft. per second and when using finely divided silica alumina catalyst the density of the dense turbulent bed 18 will be between about 20 and 30 lbs. per cubic foot.

Arranged on the opposite side within the reaction vessel 10 is an overflow well or line 28 which extends through the distribution grid 16 and up into the reaction vessel for about half the height of the reaction vessel 10 or slightly less than ½ the height of the vessel 10. The overflow pipe 28 determines the level 22 of the dense fluidized bed in the vessel 10. The overflow well 28 is provided in its upper portion with vertical slots 32 to give a smoother rate of catalyst withdrawal and to permit slight variations in the catalyst level 22 without large fluctuations in the rate at which catalyst overflows into the withdrawal well 28. The withdrawal well 28 comprises a standpipe for building up pressure on the finely divided solids being circulated and the level of the catalyst in the withdrawal 28 is below the top of the well 28 as shown at 34. One or more fluidizing lines 36 may be provided for introducing gas into the solids in the withdrawal well 28 to maintain the particles in fluidized condition.

From the bottom of the withdrawal well 28 the regenerated catalyst or contact particles are returned to a reaction zone (not shown) for use in the catalytic conversion of hydrocarbons and spent or fouled catalyst is withdrawn from such reaction zone and returned to the regenerator 10 through solids inlet line 26. When operating as a regenerator the reaction vessel 10 will be maintained at a temperature about 1000° to 1200° F., preferably 1100° to 1175° F.

The hot combustion or flue gases leave the bed 18 and pass up into the dilute or disperse phase 24 and as they contain entrained solid contact or catalyst particles they are passed through a solids separating means such as a cyclone separator 42 arranged in the upper portion of the reaction vessel 10 in the region above the overflow well 28. The separator 42 has an inlet 44 and a dipleg 46 for returning separated solids to the dense fluidized bed 18. The gases leave the separator 42 through line 48 to a second stage separating device such as cyclone separator 52 for removal of an additional amount of entrained solids from the gases which are returned to the dense bed 18 through dipleg 54. The combustion or flue gases leave the cyclone separator 52 through line 56. Both of the diplegs 46 and 54 extend below the level 22 of the dense fluidized bed 18.

In the arrangement shown with the solids inlet pipe 26 arranged in the lower portion of the reaction vessel and at one side and with the overflow well extending to a higher level than the top of the inlet line and arranged on the opposite side of the reaction vessel there is insufficient lateral mixing of the catalyst or contact particles during regeneration and in some cases afterburning has resulted. The catalyst particles, after they are introduced by the solids inlet line 26, pass generally upwardly above the inlet line 26 and after contact of the air with the high coke content fouled catalyst in this region the combustion gases leaving the dense bed 18 from above the inlet line 26 have essentially no oxygen content.

In order for the catalyst particles to get to the overflow well there is lateral flow of the catalyst in the upper portion of the dense fluidized bed and as the catalyst in the zone near this overflow well is nearly completely regenerated with a relatively low coke content, the oxygen in the combustion air is not completely utilized. Thus, the air or other oxygen-containing gas introduced through the perforated grid member 16 adjacent to overflow well 28 passes upwardly through the dense fluidized bed 18 with incomplete oxygen utilization and when this gas reaches the upper portion of the dense fluidized bed 18 it passes into the dilute phase 24 from adjacent the top of the overflow well 28 containing excess oxygen and at a temperature of about 1125° and with an oxygen concentration of about 3% by volume of the combustion gases. Under these conditions afterburning (the oxidation of CO to $CO_2$) may occur around the primary cyclone separator 42 over the region of the overflow well 28 because of the relatively low concentration of solids present in the dilute phase 24.

To minimize afterburning during regeneration and by better lateral mixing of the solids in the dense fluidized bed 18 eliminate the gradient of coke content on the catalyst across the diameter of the vessel and thereby achieve uniform oxygen content of the flue gases leaving bed 18, a mixing tube 62 is provided which is submerged in the dense fluidized bed 18 and is inclined from the horizontal at an angle of between about 20° and 70°, preferably about 45°. The mixing tube 62 is suitably supported in the reaction vessel 10. The mixing tube 62 has an expanded horizontally arranged top inlet 64 which is arranged below the level 22 of the dense bed 18 and is adjacent the top of the overflow well 28. Preferably the top of the inlet 64 is arranged at or slightly below the bottom of the vertical slots 32 in the upper portion of the overflow well 28. The main body of the mixing tube 62 slopes downwardly and its outlet end 66 is arranged above the grid member 16 and adjacent the outlet end of the solids inlet pipe 26.

In operation, the catalyst from the dense fluidized bed 18 enters the inlet 64 of the mixing tube 62 and gas disengages from the catalyst because no fluidizing gas is supplied to the mixing tube 62. Due to the disengagement of the gas the density of the fluidized mixture of catalyst in the mixing tube 62 is increased and because of the increase in density there is a driving force available for circulating the catalyst from the upper portion of the bed 18 near the overflow well to the point of discharge 66 near the inlet line 26. In this way high circulation rates may be provided and improved lateral mixing of the catalyst in the dense fluidized bed 18 is obtained. The more nearly regenerated catalyst adjacent the overflow well 32 is returned to the zone or region near the outlet of the inlet line 26 where it is backmixed with spent or fouled catalyst and better mixing of the spent and regenerated catalyst is provided in this way and the gradient of coke on catalyst across vessel 10 is minimized and substantially uniform oxygen content in the flue gas over the entire area of the dense bed 18 is obtained.

While only one mixing tube is shown in the drawing more than one such mixing tube may be used. Also while the mixing tube is shown as spaced inwardly from the overflow 28 in FIG. 1 it may be arranged at either side of the overflow well 28 adjacent to the vertical wall of reaction vessel 10. Looking at FIG. 2 the inlet portion 64 of the mixing tube 62 may be arranged in front of the overflow well 28 adjacent the wall of reaction vessel 10 as at 72 or it may be behind the overflow well 28 as at 74 and if two such mixing tubes are used they may be arranged in this manner with both discharge outlets being adjacent the outlet of the inlet line 26.

In a specific example the reaction vessel 10 has a height from the distribution grid 16 to the top of the straight vertical side 68 of 30 feet and has a diameter of about 20 feet. The inlet line 26 has a diameter of about 2 feet and extends about 3 feet above the distribution grid 16. The overflow well 28 has a diameter of about 3 feet and from the distribution grid 16 to the top of the slots 32 is about 14 feet. The slots 32 are about 1 foot deep.

The mixing tube 62 has a main diameter of about 2 feet with the inlet 64 enlarged to about 4 feet. The top of the inlet 64 is arranged about 12 feet above distribution grid 16 and about 1 foot below the bottom of the vertical slots 32 in the overflow well 28. The discharge end or outlet end 66 of the mixing tube 62 is arranged about 1 to 2 feet from the inlet line 26 and the bottom of the discharge end 66 is about 0.5 foot above the distribution grid 16.

Using conventional synthetic silica alumina gel having an average particle size of about 50 to 90 microns and with the superficial velocity of the air passing up through the dense fluidized bed 18 of about 2.5 feet per second and with the temperature in the dense bed 18 being about 1125° F. the density of the fluidized bed mixture 18 will be about 25 lbs. per cubic foot. As the catalyst enters the inlet end 64 of the mixing tube 62, deaeration of the catalyst mixture will occur and the more dense mixture of about 43 lbs. per cubic foot will create a pressure or driving force which discharges the catalyst mixture from the outlet end 62 adjacent the inlet 26 for the fouled or spent catalyst from the reactor. With a vertical height of the mixing tube 62 from the inlet 64 to outlet 66 equal to about 10 feet, a circulation driving force of about 1.25 lbs. per square inch will be developed by the catalyst particles in mixing tube 62 and where the dense bed 18 contains about 54 tons of catalyst hold up, the rate of circulation through the specific mixing tube described will be about 1200 tons per hour.

The invention is not to be limited to the specific mixing tube given in the example as larger or smaller mixing tubes may be used and more than one mixing tube may be used to obtain any desired rate of circulation of solids within the dense fluidized bed 18. While the invention has been specifically described in connection with the regeneration of spent catalyst, it is to be understood that the invention may be used with other reactions where better lateral mixing of the catalyst particles is desired.

While the invention has been described in connection with a specific design and arrangement, the invention is not to be restricted therto as in some instances the solid particles from the upper portion of the fluidized bed above the inlet line 26 may be passed through a reverse slanting mixing tube 62 to above the grid member 16 adjacent the bottom portion of overflow well 28. That is, in FIG. 1 the flared or expanded inlet 64 of mixing tube would be at the left near the top of the fluidized bed 18, the mixing tube would slant in the opposite direction, toward the right in FIG. 1 and the discharge end 66 would be on the right in FIG. 1 adjacent the top of grid member 16 and near the bottom of overflow well line 28. Thus in a regeneration zone, for example, partially regenerated spent catalyst particles from the region above inlet 26 would be directed down to the bottom portion of the fluid bed 18 near the bottom of overflow line 28 and above grid member 16 to obtain better lateral mixing of the catalyst particles in the fluid bed 18 and minimize or prevent afterburning.

This case is filed as a continuation-in-part of Borey application Serial No. 456,207, filed September 15, 1954, which issued on November 24, 1959, as U.S. Patent No. 2,914,387.

What is claimed is:

1. A method of contacting finely divided solids and gasiform material which includes maintaining a fluidized dense bed of solids in a reaction zone, introducing solids into the lower portion of said fluidized bed at one side of said reaction zone, withdrawing solids from the upper portion of said fluidized bed of solids at the opposite side of said reaction zone, collecting solids from the upper portion of said fluidized bed of solids adjacent the region of withdrawal of solids from said fluidized bed, effecting partial deaeration of said collected solids to form a more dense fluidized mixture and flowing such more dense mixture as a confined inclined stream within said dense fluidized bed to the lower portion of said fluidized dense bed of solids adjacent the region of introduction of solids to said dense fluidized bed.

2. A method according to claim 1 wherein said inclined stream is at an angle between about 20° and 70° to the horizontal.

3. A method according to claim 1 wherein said reaction zone comprises a regeneration zone and said finely divided solids comprise cracking catalyst.

4. In a method of regenerating finely divided catalyst particles from a hydrocarbon conversion operation wherein catalyst particles are maintained in a dense fluidized condition in a regeneration zone by upflowing oxidizing gas and fouled catalyst particles to be regenerated are introduced into the lower portion only of said dense fluidized bed and at one side thereof and regenerated catalyst particles are withdrawn from the upper portion only of said dense fluidized bed, the improvement for minimizing afterburning which comprises circulating regenerated catalyst particles within said dense fluidized bed from near the region of withdrawal of regenerated catalyst particles to near the region of introduction of fouled catalyst particles as a confined stream within said dense fluidized bed and inclined to the horizontal between about 20° and 70° to obtain improved mixing of the fouled and regenerated catalyst particles.

5. In a method of contacting finely divided solids and gasiform material which includes maintaining a dense fluidized bed of solids in a reaction zone by upflowing gasiform material and solids are introduced into one portion of said dense fluidized bed and solids are withdrawn from another portion of said dense fluidized bed, the improvement for obtaining better lateral mixing of the solids in said dense fluidized bed which comprises circulating solids within said fluidized bed by flowing a confined inclined stream of solids of higher density than that of said dense fluidized bed and within said dense fluidized bed from near the upper portion of said dense fluidized bed at one side of said dense fluidized bed to near the lower portion of said dense fluidized bed at the opposite side of said dense fluidized bed.

6. A method of contacting finely divided solids and gasiform material which includes maintaining a fluidized dense bed of solids in a contacting zone, introducing solids to be treated into the lower portion only of said fluidized bed, withdrawing solids from an upper portion only of said fluidized bed of solids, collecting solids from an upper portion of said fluidized bed of solids, effecting partial deaeration of said collected solids to form a more dense fluidized mixture and flowing such more dense mixture as a confined downwardly flowing stream within said dense fluidized bed to the lower portion of said fluidized dense bed of solids within said contacting zone near the region of introduction of solids thereto.

References Cited in the file of this patent

UNITED STATES PATENTS 2,689,823     Hardy et al.  ------------ Sept. 21, 1954